(12) United States Patent
Carnevali

(10) Patent No.: US 7,731,140 B2
(45) Date of Patent: Jun. 8, 2010

(54) INTERCHANGEABLE SNAP-IN DEVICE MOUNTING APPARATUS

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 789 days.

(21) Appl. No.: 11/205,747

(22) Filed: Aug. 17, 2005

(65) Prior Publication Data

US 2007/0040080 A1  Feb. 22, 2007

(51) Int. Cl.
*A47B 9/00* (2006.01)
(52) U.S. Cl. .............................. 248/221.11; 248/231.81
(58) Field of Classification Search ............. 248/309.1, 248/311.2, 312.1, 231.81, 231.5; 403/317
See application file for complete search history.

(56) References Cited

U.S. PATENT DOCUMENTS

| | | | |
|---|---|---|---|
| 4,779,515 A | 10/1988 | Staub, Jr. | |
| 4,884,656 A | 12/1989 | Baheti et al. | |
| 4,989,911 A | 2/1991 | Van Order | |
| 5,018,901 A * | 5/1991 | Ferree et al. ................. | 403/349 |
| 5,056,853 A | 10/1991 | Van Order | |
| 5,061,005 A | 10/1991 | Van Order | |
| 5,201,564 A | 4/1993 | Price | |
| 5,248,134 A | 9/1993 | Ferguson et al. | |
| 5,261,650 A | 11/1993 | Hein | |
| 5,299,066 A | 3/1994 | Rombult | |
| 5,314,149 A | 5/1994 | Pim et al. | |
| 5,350,190 A | 9/1994 | Szigethy | |
| 5,373,746 A | 12/1994 | Bloss | |
| 5,752,853 A | 5/1998 | Curtindale | |
| 5,756,890 A | 5/1998 | Fedison, Jr. | |
| 5,775,482 A | 7/1998 | Wolfe et al. | |
| 5,845,885 A | 12/1998 | Carnevali | |
| 6,015,126 A | 1/2000 | Murdock | |
| 6,021,986 A | 2/2000 | Murdock | |
| 6,129,221 A * | 10/2000 | Shaha ....................... | 211/87.01 |
| 6,325,408 B1 * | 12/2001 | Ford ......................... | 280/728.2 |
| 6,336,672 B2 * | 1/2002 | Beaver ....................... | 296/97.9 |
| 6,361,335 B1 | 3/2002 | Calanni et al. | |
| 6,460,666 B1 | 10/2002 | Wach | |
| 6,463,630 B1 * | 10/2002 | Howie, Jr. ................... | 16/441 |
| 6,508,092 B1 | 1/2003 | Laabs et al. | |
| 6,679,177 B1 * | 1/2004 | Wu et al. .................... | 102/377 |
| 6,686,730 B2 | 2/2004 | Marasch et al. | |
| 7,438,341 B1 * | 10/2008 | Olson, Jr. ................... | 296/97.9 |
| 2005/0028325 A1 | 2/2005 | Carnevali | |
| 2005/0092875 A1 | 5/2005 | Carnevali | |

* cited by examiner

*Primary Examiner*—Amy J Sterling
*Assistant Examiner*—Steven M Marsh
(74) *Attorney, Agent, or Firm*—Charles J. Rupnick, Attorney at Law

(57) ABSTRACT

A combination of quick connect and disconnect device mounting apparatus. Multiple different interchangeable male adapter bases are provided each having a round-tipped diamond-patterned male base plate that fits into and mates with a complementary round-tipped diamond-patterned receptacle formed in one of multiple different interchangeable female receivers. The complementary round-tipped diamond-patterned shapes drive the adapter's male base plate to become aligned and positioned relative to the receiver's female receptacle during assembly.

20 Claims, 6 Drawing Sheets

INTERCHANGEABLE SNAP-IN DEVICE MOUNTING APPARATUS

FIELD OF THE INVENTION

The present invention relates to a quick connect and disconnect device mounting apparatus, and in particular to a device mounting apparatus having a receiver structure capable of accommodating multiple different adapter bases having different connector structures.

BACKGROUND OF THE INVENTION

There exists a variety of quick connect and disconnect device mounting apparatus, some including snap-in type constructions that are preferable from ease of installation and cost of manufacturing standpoints. However, previous snap-in type device mounting apparatus have been complex and limited to two specific mating parts that are meant to be assembled exclusively with each other.

SUMMARY OF THE INVENTION

The present invention overcomes complexity and interchangeability limitations of the prior art by providing a combination of quick connect and disconnect device mounting apparatus. Multiple different interchangeable male adapter bases are provided each having a round-tipped diamond-patterned male base plate that fits into and mates with a complementary round-tipped diamond-patterned receptacle formed in one of multiple different interchangeable female receivers. The complementary round-tipped diamond-patterned shapes drive the adapter's male base plate to become aligned and positioned relative to the receiver's female receptacle during assembly.

A precision registration mechanism is provided between each adapter's male base plate and a mating receptacle of a female receiver, the precision registration mechanism is a combination of precision locating pins or detents and cooperating mating holes that stabilize an engaged position of the male adapter base in the female receptacle.

Each female receiver includes integral fixed and resiliently movable retaining lips that together retain the male base plate of any one of the different interchangeable male adapter bases inserted therein. The resiliently movable retaining lip is provided as one integral part of an integral snap-in clamping mechanism that closes the resiliently movable retaining lip over the male base plate of the inserted male adapter base.

The different interchangeable male adapter bases each have a different connector structure integrated with its round-tipped diamond-patterned male base plate. The different connector structures include, by example and without limitation, a round-tipped diamond-patterned support structure with spaced-apart fasteners or clearance holes for fasteners for attaching to existing mounting devices having similar round-tipped diamond-patterned interface structures with spaced-apart fasteners or fastener clearance holes; a sphere of resiliently compressible material for operation as the ball portion of a ball-and-socket mounting device of the type disclosed in U.S. Pat. No. 5,845,885; a socket structure that is configured for rotationally coupling the ball portion of any ball-and-socket mounting device; a support post structured for receiving a fastener, the threaded post of a ball portion of a ball-and-socket mounting device, or a permanently bendable metal rod of the type disclosed in published U.S. patent application Ser. No. 10/698,158; or a magnetic coupler having one or more magnets or magnetically attractive slugs set into the base plate, to name a few of the multiple different connector structures provided by the different interchangeable male adapter bases.

The female receiver includes an integral connector structure formed as part of an exterior connector surface opposite from receptacle, the connector structure having at least two optional configurations: a round-tipped diamond-patterned support structure with clearance holes for fasteners for attaching to existing mounting devices having a cooperating round-tipped diamond-patterned structure, such as a ball-and-socket mounting device of the type disclosed in U.S. Pat. No. 5,845,885, or another suitable existing mounting devices having a cooperating round-tipped diamond-patterned structure. According to other aspects of the invention, the integral connector structure of the female receiver optionally includes any one of the multiple different connector structures provided by the different interchangeable male adapter bases.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 9, 10 and 11 illustrate by example and without limitation some different interchangeable male adapter bases of the invention having other different connector structures, wherein:

FIG. 9 illustrates the connector structure of one male adapter base of the invention being configured with a sphere of resiliently compressible material for operation as the ball portion of an existing ball-and-socket mounting device, FIG. 10 illustrates the connector structure of one male adapter base of the invention being configured with a support post structured for receiving a fastener, the threaded post of a ball portion of an existing ball-and-socket mounting device, or an existing permanently bendable metal rod, and FIG. 11 illustrates the connector structure of one male adapter base of the invention being configured with a magnetic coupler having one or more magnets or magnetically attractive slugs set into the base plate of the invention.

DETAILED DESCRIPTION OF PREFERRED EMBODIMENT

In the Figures, like numerals indicate like elements

Figure 1:
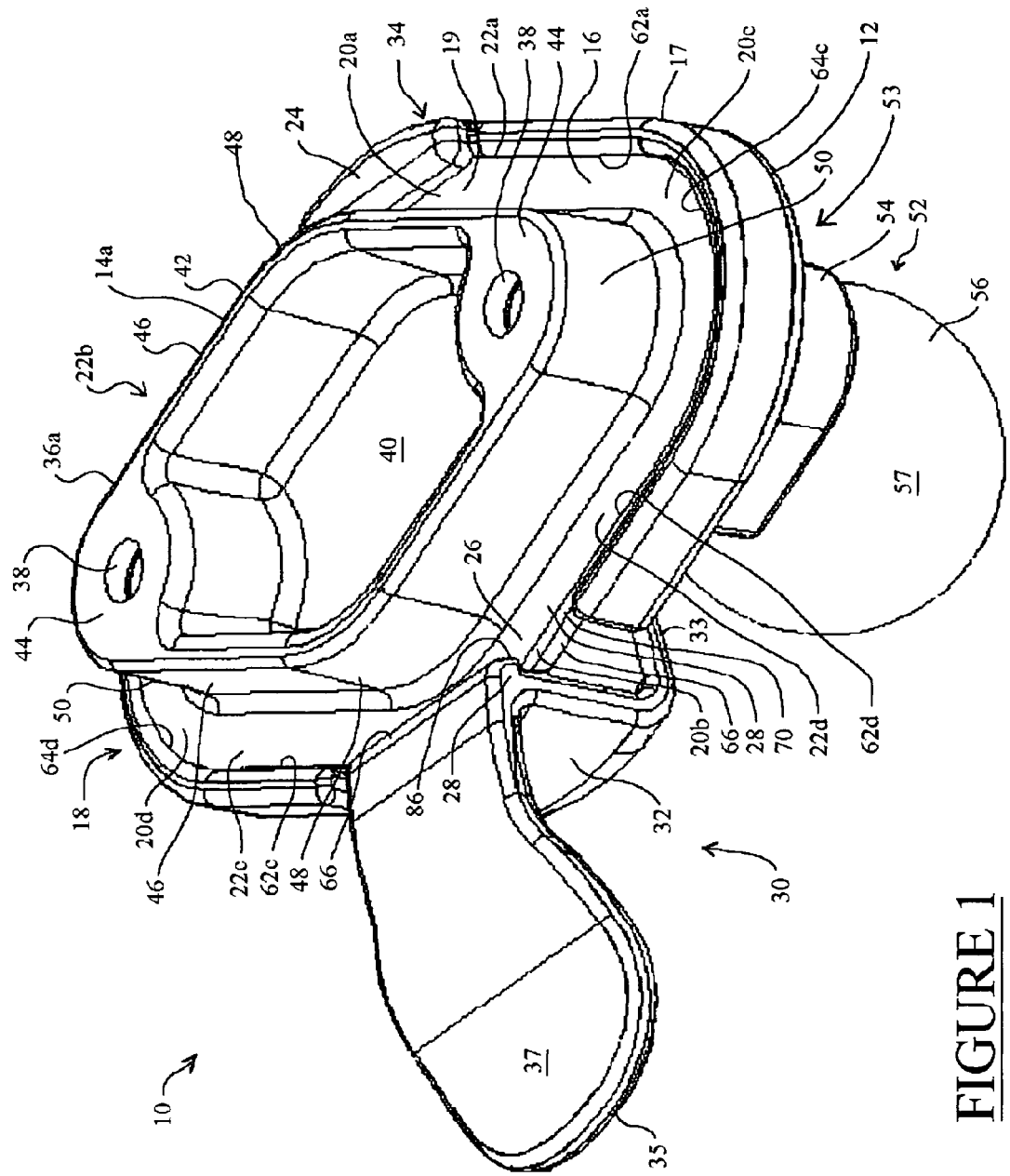
FIG. 1 illustrates the present invention by example and without limitation embodied as a system of snap-in and quick-release cooperatively structured female receiver and a quantity of different interchangeable male adapter bases.

FIG. 1 illustrates the present invention by example and without limitation embodied as a system 10 of snap-in and quick-release cooperatively structured female receiver 12 and a quantity of different interchangeable male adapter bases 14a through 14n (shown in subsequent figures), the system 10 having a quick snap-in stable multi-stage positioning and quick-release mechanism. As illustrated, female receiver 12 and male adapter bases 14a-n are structured having cooperative diamond-shapes with rounded tips. A diamond-shaped base plate 16 portion of each male adapter base 14a-n is sized and shaped to fit into a slightly oversized cooperating diamond-shaped receptacle 18 formed within a partial peripheral lip 17 of female receiver 12. The partial peripheral lip 17 of female receiver 12 includes a fixed lip portion 24 overhanging a small corner portion of diamond-shaped receptacle 18. A first relatively small peripheral lip portion 19 of base plate 16 adjacent to a round-tipped side edge intersection 20a between two substantially straight peripheral edges 22a and 22b (shown in subsequent one or more figures) is inserted under fixed retaining lip portion 24 of peripheral lip 17 partially surrounding diamond-shaped receptacle 18. This first relatively small peripheral lip portion 19 of base plate 16 is thereafter captured under fixed retaining lip 24 of female receiver 12, the fixed lip 24 overhanging receptacle 18 at about the net thickness of base plate 16. The partial peripheral lip 17 is broken opposite from retaining lip portion 24, and a resiliently movable retaining lip 28 of female receiver 12 is formed therein. The base plate 16 has a second relatively small peripheral lip portion 26 adjacent to an opposite other round-tipped side edge intersection 20b between two other substantially straight edges 22c and 22d. This second small peripheral lip portion 26 of base plate 16 is captured under resiliently movable retaining lip 28 of female receiver 12, the movable lip 28 also overhanging receptacle 18 at about the net thickness of base plate 16.

Movable retaining lip 28 is one integral part of an integral movable clamping mechanism 30 that includes a resiliently flexible integral arm portion 32 that, by example and without limitation, suspends integral movable retaining lip 28 relative to receptacle 18. By example and without limitation, resiliently flexible arm portion 32 is suspended from a central portion 18a of receptacle 18 of female receiver 12 through an intervening rigid arm portion 33 that provides it sufficient length under movable retaining lip 28 for operation of movable clamping mechanism 30, as best illustrated in subsequent figures. In operation, resiliently flexible arm 32 presses against side edge intersection 20b under captured lip portion 26 of base plate 16, and compresses base plate 16 within cooperating receptacle 18, with opposite side edge intersection 20a pressed against an opposite curved rear wall intersection 34 (shown in one or more subsequent figures) under fixed retaining lip 24 of receptacle 18. Clamping mechanism 30 is deflected by operation of a tongue 35 having a pressure application surface 37 that provides leverage for reducing the force required for deflecting resiliently flexible arm portion 32.

A quantity of different male adapter bases 14a through n are provided, each different adapter base 14a-n including a different connector structure 36a through 36n, respectively, that is configured for having secured thereto the mounting structure of an external device to be releasably mounted by the system 10 of the invention. Connector structures 36a-n are positioned central of an exterior connector surface 40 of base plate 16 of each different adapter base 14a-n.

Male adapter base 14a includes connector structure 36a that is configured for having secured thereto the mounting structure of an external device to be releasably mounted by the system of the invention, Male adapter base connector structure 36a is, for example, formed either a pair of spaced-apart fasteners or fastener clearance holes 38 (shown) in a round-tipped diamond pattern support structure 42. For example, when embodied as the diamond pattern, connector structure 36a includes the pair of spaced-apart fastener clearance holes 38 positioned within an exterior connector surface 40 of the base plate 16. The pair of spaced-apart fastener clearance holes 38 are structured for coupling the male adapter base 14 to a ball-and-socket mounting device, or another structure suitable for supporting a mobile device, such as a cellular telephone, a global positioning system (GPS), a personal digital assistant (PDA), or other mobile device. The snap-in and quick-release system 10 of the invention thus makes interchangeable mounting of such different devices easy, simple and virtually instant. While connector structure 36a is illustrated by example as one pair of spaced-apart fastener clearance holes 38, connector structure 36a is not so limited as the exemplary embodiment depicted. Rather, connector structure 36a is optionally embodied as having more or less of fastener clearance holes 38. Fastener clearance holes 38 are optionally internally threaded for receiving a threaded fastener, or are constructed with a smooth bore (shown) as clearance holes for threaded or other fasteners. Optionally, diamond pattern support structure 42 of connector structure 36a includes a pair of pedestals or bosses 44 integrally formed on exterior connector surface 40 of base plate 16, with bosses 44 containing the pair of spaced-apart fastener clearance holes 38. Connector structure 36a also includes stiffeners 46 between the bosses 44. Stiffeners 46 are formed integrally with both exterior connector surface 40 of base plate 16 and optionally configured in an diamond pattern having rounded side tips 48 at their intersection adjacent to round-tipped side edge intersections 20a and 20b, and rounded outer surfaces 50 of bosses 44 at the diamond pattern points adjacent to round-tipped end edge intersections 20c and 20d, as illustrated. Stiffeners 46 are optionally configured in another shape desirable for conforming to a ball-and-socket mounting device, or another mounting structure of choice.

Figure 2:
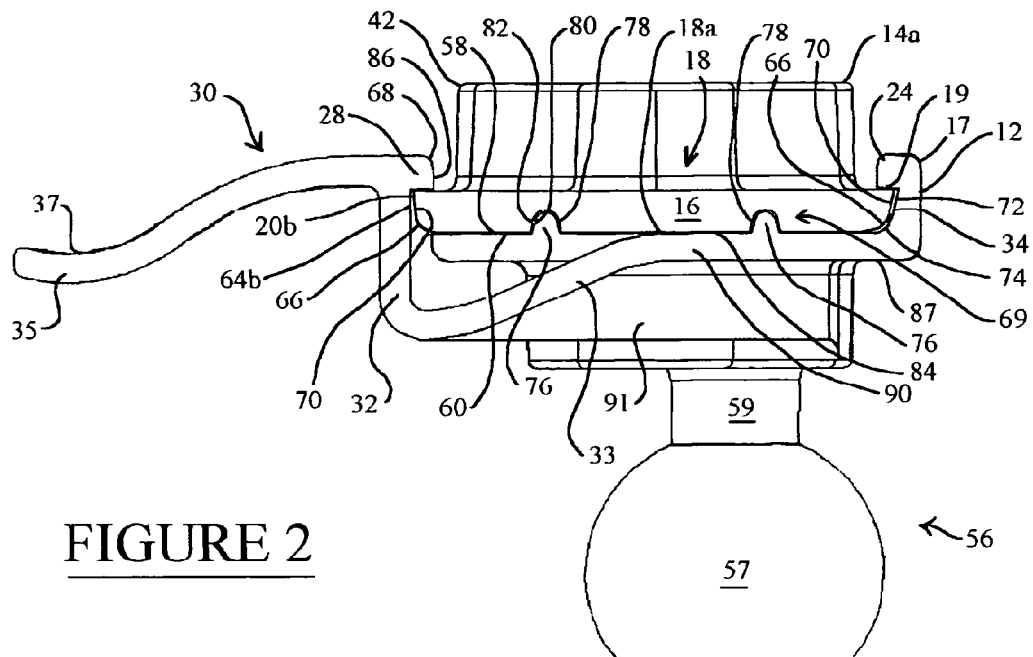
FIG. 2 is a partial section view that illustrates operation of the quick snap-in stable multi-stage positioning and quick-release mechanism of the system of the invention.

Female receiver 12 includes an integral connector structure 52 as part of an exterior connector surface 53 (best shown in FIG. 2). Connector structure 52 is configured for being secured to an external mounting surface. For example, connector structure 52 has either a pair of spaced-apart fasteners or fastener clearance holes in a round-tipped diamond patterned support structure 54 similar to the round-tipped diamond pattern support structure 42 of connector structure 36a, a ball mount structure 56 of a universally positionable ball-and-socket mounting device, or a combination of both structures 54 and 56, as illustrated here.

FIG. 2 is a partial section view that illustrates operation of the quick snap-in stable multi-stage positioning and quick-release mechanism of the system 10 having snap-in and quick-release female receiver 12 and male adapter bases 14a-n, whereby adapter base plate 16 of any one of several different male adapter bases 14a-n (male adapter bases 14a shown) is releasably retained within cooperating female receiver receptacle 18. Lip portions 19 and 26 of base plate 16 are captured under respective fixed and moveable retaining lips 24 and 28 of female receiver 12. Each adapter base plate 16 is formed having a substantially rigid body (indicated generally at 16) between spaced-apart substantially parallel exterior connector surface 40 and an exterior bottom surface 58. When any one of several different male adapter bases 14a-n is releasably retained within cooperating female receiver receptacle 18, exterior bottom surface 58 of diamond-shaped base plate 16 mates with and is seated against a cooperating interior bottom surface 60 of cooperating diamond-shaped female receiver receptacle 18.

During an initial coarse positioning and alignment phase of assembly of the system 10, with exterior bottom surface 58 of diamond-shaped base plate 16 of male adapter base 14a being directed toward interior bottom surface 60 of cooperating diamond-shaped receptacle 18 of female receiver 12, any round-tipped edge intersection 20a, 20b, 20c or 20d or any substantially straight edge portion 22a, 22b, 22c or 22d around the periphery of diamond-shaped base plate 16 is inserted into cooperating diamond-shaped receptacle 18. Thereafter, small lip portion 19 of male adapter base plate 16 adjacent to round-tipped edge intersection 20a is fed under fixed retaining lip 24 of female receiver 12. The cooperating round-tipped diamond shapes base plate 16 and receptacle 18 ensure that pressure exerted on male adapter base 14a generally toward retaining lip 24 of female receiver 12 causes the round-tipped side edge intersection 20a or 20b between two edges 22a, 22b or 22c, 22d closest to retaining lip 24 to slide along a substantially straight interior wall surface 62a or 62b (shown in subsequent one or more figures) inside of diamond-shaped receptacle 18 toward and into cooperating curved rear wall intersection 34 (shown in phantom) between the substantially straight interior rear wall surfaces 62a and 62b. Simultaneous with fitting round-tipped side edge intersection 20a together with cooperating curved intersection 64a, all substantially straight edges 22a, 22b, 22c and 22d automatically align with a corresponding one of substantially straight interior side wall surfaces 62a, 62b, 62c or 62d inside of diamond-shaped receptacle 18. Also, round-tipped end edge intersections 20c and 20d between respective pairs of substantially straight edges 22a, 22d and 22b, 22c automatically align with a corresponding one of curved end wall surfaces 64c and 64d, and opposite round-tipped side edge intersection 20b automatically aligns with corresponding curved interior side wall surface 64b formed as an inside surface of flexible arm 32 under movable retaining lip 28 of clamping mechanism 30.

Diamond-shaped base plates 16 of male adapter bases 14a-n are substantially symmetric along both a long axis L and mutually perpendicular short axis S such that no distinction is made between fitting round-tipped side edge intersection 20a or opposite round-tipped side edge intersection 20b together with cooperating curved intersection 34 opposite from movable retaining lip 28 of female receiver 12. The different connector structures 36a-n of respective different adapter bases 14a-n are also substantially symmetric along both a long axis L and short axis S such that again no distinction is made between fitting side edge intersection 20a or opposite side edge intersection 20b is fitted together with cooperating curved intersection 34. Thus, diamond-shaped base plate 16 of male adapter base 14a is generally aligned with cooperating diamond-shaped receptacle 18 of female receiver 12, with the cooperating diamond-shapes being generally mutually oriented, regardless whether side edge intersection 20a or opposite side edge intersection 20b is fitted together with cooperating curved intersection 34.

In an initial insertion phase of assembly, after male adapter base 14a is installed by insertion of small side lip portion 19 of base plate 16 under retaining lip 24 of female receiver 12 and diamond-shaped male adapter base plate 16 is automatically generally aligned with cooperating diamond-shaped receptacle 18, a beveled or curved (shown) partial side wall installation surface 66 peripheral of base plate 16 between diamond-shaped bottom surface 58 and rounded side edge intersection 20b engages an opposing beveled or curved (shown) installation surface 68 of movable retaining lip 28 of female receiver 12. Pressure is applied on first male adapter base 14a toward female receiver 12 causes the partial installation surface 66 of base plate 16 to press against the opposing installation surface 68 of movable retaining lip 28 of female receiver 12. The applied pressure forcibly bends resiliently flexible arm 32, which forces movable retaining lip 28 outwardly away from cooperating receptacle 18 until spaced sufficiently to permit small lip portion 26 of adapter base plate 16 to slip past. Thereafter, adapter base plate 16 fits into slightly oversized cooperating receiver receptacle 18.

Adapter base plate 16 is slightly undersized relative to slightly oversized cooperating receptacle 18 so that general alignment and orientation is sufficient for an intermediate positioning phase of insertion to occur. Intermediate positioning is provided by cooperating partial side wall positioning surfaces 70 and 72 along peripheral straight edges 22a through 22d of adapter base plate 16 and corresponding straight interior wall surfaces 62a through 62d of cooperating receiver receptacle 18. Cooperating positioning surfaces 70 and 72 are optionally mutually curved or beveled (shown), such that positioning surfaces 70 of adapter base plate 16 slide down the cooperating curve or incline of corresponding positioning surface 72 toward interior bottom surface 60 of female receptacle 18. The angles on mutually beveled positioning surfaces 70 and 72 are, for example, as little as the draft angle typical of an injection molded device, but may be greater to improve positioning of adapter base plate 16. Simultaneously with mating of cooperating partial side wall positioning surfaces 70 and 72, side curves 20a, 20b and end curves 20c, 20d cooperate with corresponding curved side and end intersections 34, 64b and 64c, 64d for rotating adapter base plate 16 into fine alignment with slightly oversized cooperating receiver receptacle 18.

Before exterior bottom surface 58 of base plate 16 contacts interior bottom surface 60 of female receptacle 18, beveled or curved (shown) installation surfaces 66 operate as male nesting surfaces with cooperating interior nesting surfaces 74 of female receptacle 18. Installation surfaces 66 are provided along substantially the entirety of all peripheral straight edges 22a-d and rounded edge intersections 20a-d of adapter base plate 16, while cooperating interior nesting surfaces 74 are provided in female receptacle 18 between interior bottom surface 60 and corresponding side wall positioning surfaces 72. Beveled or curved (shown) installation surfaces 66, along rounded side intersection edges 22a and 22b leading the installation of adapter base plate 16, engage and nest with corresponding beveled or curved interior nesting surfaces 74 of female receptacle 18.

Nesting of leading installation surfaces 66 with corresponding interior nesting surfaces 74 provides sufficient relative positioning of male adapter base plate 16 within female receptacle 18 to permit precision registration phase of installation to occur, wherein a precision registration mechanism 69 provides precision positioning of male adapter base plate 16 within female receptacle 18. For example, precision registration mechanism 69 includes two or more precision registration pins 76 that engage between base plate bottom surface 58 and interior bottom surface 60 of female receptacle 18. Precision registration pins 76 are formed to project from interior bottom surface 60 of female receptacle 18 toward exterior bottom surface 58 of base plate 16. Each of the two or more precision registration pins 76 engages a corresponding mating precision hole 78 formed into base plate exterior bottom surface 58 opposite. However, respective positions of the precision registration pins 76 and mating precision holes 78 can be reversed with the precision registration pins 76 projected from base plate bottom surface 58 and mating precision holes 78 formed in receptacle bottom surface 60, without departing from the spirit and scope of the invention. By example and without limitation, one embodiment of the invention includes four of the registration pins 76 and mating precision holes 78 in cooperating rectangular patterns within the diamond pattern of the base plate bottom surface 58 and female receptacle interior bottom surface 60. The two or more mating precision registration pins 76 and precision holes 78 cooperate to precisely position male adapter base plate 16 within female receptacle 18. Furthermore, the two or more mating precision registration pins 76 and precision holes 78 cooperate to stabilize the final position of male adapter base plate 16 relative to female receptacle 18. The two or more mating precision registration pins 76 and precision holes 78 cooperate to resist substantially any relative translation or sliding motion between the base plate exterior bottom surface 58 and receptacle interior bottom surface 60. However, the precision registration pins 76 and precision holes 78 are shaped having mating curved or sloped (shown) side pin and hole surfaces 80 and 82 that permit easy engagement and disengagement therebetween. Alternatively, mating precision registration pins 76 are formed as rounded bumps having precision base diameters and precision holes 78 are formed as mating rounded-out recesses having precision opening diameters.

When precision registration pins 76 are substantially exactly matched to precision holes 78, the side hole surfaces 82 rest directly on the side pin surfaces 80 simultaneously with the base plate exterior bottom surface 58 resting substantially flush against receptacle interior bottom surface 60. However, precision registration pins 76 are alternatively slightly oversized relative to precision holes 78 so that the side hole surfaces 82 rest on the side pin surfaces 80, but base plate exterior bottom surface 58 does not quite rest flush against receptacle interior bottom surface 60. Rather, a narrow stand-off gap 84 exists between base plate exterior bottom surface 58 and receptacle interior bottom surface 60 when male adapter base plate 16 is effectively seated within female receptacle 18.

Upon mutual engagement of precision registration pins 76 with precision holes 78, male adapter base plate 16 is effectively seated within female receptacle 18 with base plate exterior bottom surface 58 flush against receptacle interior bottom surface 60. Male adapter base 14a can only be moved relative to female receptacle 18 by lifting it away from receptacle interior bottom surface 60.

Also upon mutual engagement of precision registration pins 76 with precision holes 78, side wall positioning surface 70 of male adapter base 14 disengages from opposing extended installation surface 86 on the inside of movable retaining lip 28 below beveled or curved (shown) installation surface 68. Whereupon, the pressure of engagement between opposing positioning and installation surfaces 66 and 86 is removed from causing resiliently flexible arm 32 to bend, and flexible arm 32 resiliently snaps back toward the opposite receptacle wall intersection 34 and retaining lip 24. Movable retaining lip 28 thereby moves to a closed position over the small lip portion 26 of base plate 16, whereby male adapter base 14 is captured within receptacle 18 of female receiver 12. Meanwhile, clamping mechanism 30 fixes base plate 16 within receptacle 18 when flexible arm 32 presses against side edge intersection 20b of base plate 16, and simultaneously presses opposite side edge intersection 20a against opposite curved wall intersection 34. Resiliently flexible arm 32 pressing against the side edge intersection 20b of base plate 16 causes the two opposite straight side edges 22a and 22b to press against corresponding receptacle straight interior wall surface 62a and 62b, and also causes round-tipped side edge intersection 20a between the two opposite straight side edges 22a and 22b to press against corresponding receptacle curved interior wall intersection 34 between the straight interior wall surfaces 62a and 62b. Forced engagement of base plate straight side edges 22a and 22b and side edge intersection 20b therebetween with corresponding receptacle straight interior wall surface 62a and 62b and curved interior wall intersection 34 therebetween forcibly aligns base plate 16 of male adapter base 14a with cooperating diamond-shaped receptacle 18 of female receiver 12.

During removal, pressure is applied to application surface 37 of tongue 35 portion of clamping mechanism 30. The applied pressure forcibly bends resiliently flexible arm 32 and moves movable retaining lip 28 outwardly away from cooperating receptacle 18 until spaced sufficiently to permit small edge lip portion 19 of base plate 16 to slip past. Base plate 16 of male adapter base 14a is tipped to lift lip portion 19 out of cooperating receptacle 18. Thereafter, opposite small lip portion 26 is slid out from under retaining lip 24 of female receiver 12, and base plate 16 of male adapter base 14 is lifted free of cooperating receptacle 18.

Thereafter, another of the different male adapter bases 14b-n is substituted for removed adapter base 14a according to the recited assembly process.

Figure 3:
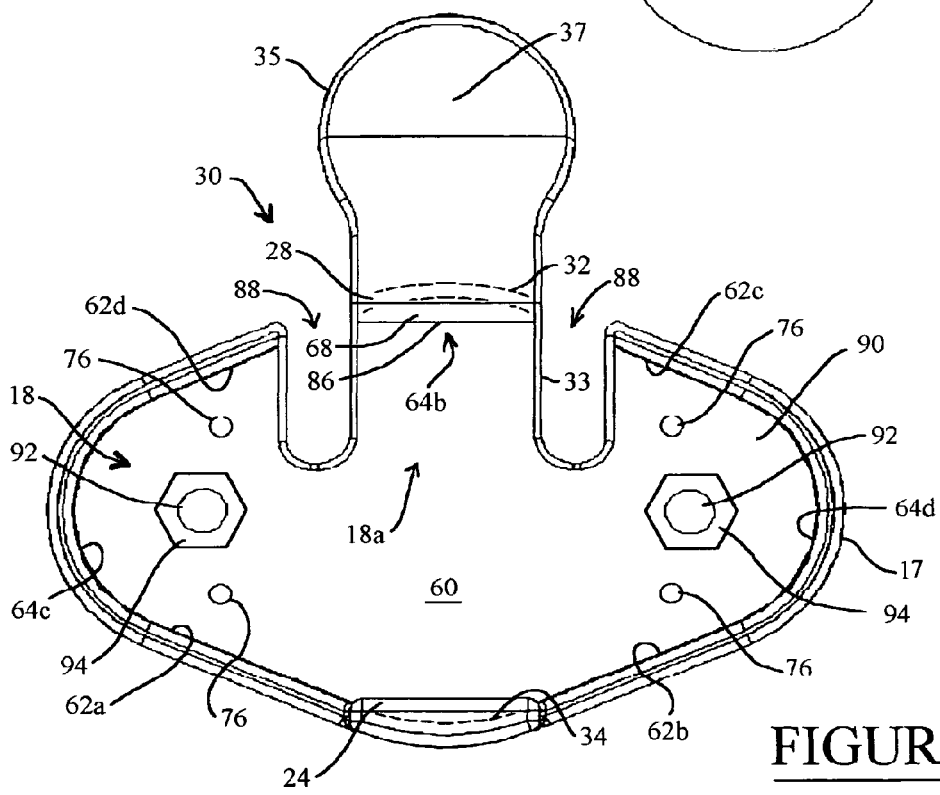
FIG. 3 is a plan view of the female receiver of the invention showing diamond-shaped receptacle having diamond-shaped interior bottom surface surrounded by an integral lip having a fixed retaining lip overhanging one portion of the interior bottom surface opposite from a clamping mechanism having a movable retaining lip overhanging an opposite portion of the interior bottom surface.

FIG. 3 is a plan view of the female receiver 12 showing diamond-shaped receptacle 18 having diamond-shaped interior bottom surface 60 surrounded by substantially straight interior side wall surfaces 62a, 62b, 62c, 62d with curved side wall surface 64a (shown in phantom) and curved end wall surfaces 64c and 64d. Fixed retaining lip 24 of female receiver 12 is shown as overhanging a side corner of interior bottom surface 60 of diamond-shaped receptacle 18 and obscuring curved side wall surface 64a. Clamping mechanism 30 is shown having curved surface 64b (shown in phantom) formed as an inside surface of resiliently flexible arm 32 under movable retaining lip 28 shown having beveled or curved (shown) installation surface 68 followed on its inside by extended installation surface 86. A pair of side cut-outs 88 interrupt partial peripheral lip 17 on either side of flexible arm 32. Intervening rigid arm portion 33 suspending resiliently flexible arm 32 of clamping mechanism 30 is shown as being decoupled from central portion 18a of female receiver receptacle 18 by the pair of side cut-outs 88 that interrupt partial peripheral lip 17. The pair of side cut-outs 88 extend through floor 90 of receptacle 18 for decoupling flexible arm 32 therefrom. A rigid spine 91 (shown in preceding and subsequent figures) is formed as an integral stiffener of intervening rigid arm portion 33 and is formed integrally with a bottom surface 93 of receptacle 18. Rigid spine 91 stiffens intervening rigid arm portion 33 against excessive deflection of flexible arm portion 32. Alternatively, floor portion 90 of receptacle 18 is sloped in the areas of side cut-outs 88 and connects directly with intervening rigid arm portion 33 for stiffening intervening rigid arm portion 33 against excessive deflection of flexible arm portion 32, whereby side cut-outs 88 are obviated.

Female receiver 12 is illustrated having a pair of spaced-apart fasteners or fastener clearance holes 92 (shown) as part of round-tipped diamond patterned support structure 54 that is similar to the round-tipped diamond pattern support structure 42 of connector structure 36a (shown in one or more previous figures). Optionally, clearance holes 92 are recessed into floor 90 of receptacle 18 and may be surrounded by recessed square or hexagonal (shown) nut cups 94, which also accommodates a bolt head.

Figure 4:
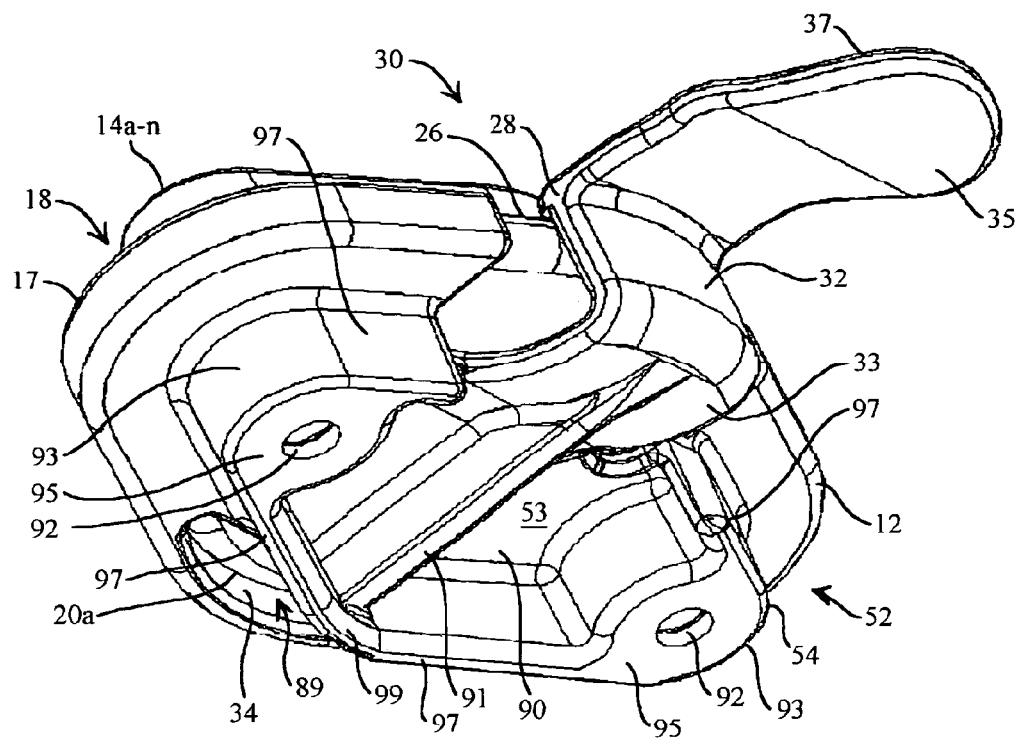
FIG. 4 is a perspective view of the snap-in and quick-release system of the invention having one of multiple different male adapter bases assembled with the cooperatively structured female receiver.

FIG. 4 is a perspective view of the snap-in and quick-release system 10 of the invention having one of male adapter bases 14a through 14n assembled with cooperatively structured female receiver 12. Female receiver 12 is illustrated as being integrally formed with connector structure 52 that is configured as round-tipped diamond patterned support structure 54 that is similar to the round-tipped diamond pattern support structure 42 of connector structure 36a (shown in one or more previous figures). For example, when embodied as the diamond pattern, support structure 54 includes the pair of spaced-apart fastener clearance holes 92 positioned within floor 90 of receptacle 18. The pair of spaced-apart fastener clearance holes 92 are structured for coupling the female receiver 12 to a ball-and-socket mounting device, or another suitable support structure. While support structure 54 is illustrated by example as one pair of spaced-apart fastener clearance holes 92, support structure 54 is not so limited as the exemplary embodiment depicted. Rather, support structure 54 is optionally embodied as having more or less of fastener clearance holes 92. Fastener clearance holes 92 are optionally internally threaded for receiving a threaded fastener, or are constructed with a smooth bore (shown) as clearance holes for threaded or other fasteners. Diamond pattern support structure 42 of support structure 54 optionally includes a pair of pedestals or bosses 95 integrally formed on exterior surface 40 of base plate 16, with bosses 95 containing the pair of spaced-apart fastener clearance holes 92 and the pair of nut cups 94 when present. Support structure 54 also includes stiffeners 97 between the bosses 95. Stiffeners 97 are formed integrally with both floor 90 of receptacle 18 and optionally configured in an diamond pattern having rounded side tips 99 at their side intersection adjacent to one end of rigid spine 91, and rounded outer surfaces 93 of bosses 95 at the diamond pattern points, as illustrated. Stiffeners 97 are optionally configured in another shape desirable for conforming to a ball-and-socket mounting device, or another mounting structure of choice.

Also illustrated is rigid spine 91 formed integrally with both intervening rigid arm portion 33 and bottom surface 93 of receptacle 18 for stiffening intervening rigid arm portion 33 against excessive deflection of flexible arm portion 32.

Here also, side edge intersection 20a of base plate 16 is visible through a widow 89 through floor 90 of receptacle 18 being pressed against curved rear wall intersection 34 under fixed retaining lip 24 of receptacle 18, as described in detail herein.

Many other configuration of connector structure 52 are also considered for female receiver 12 of the invention and may be substituted for the different configurations shown without departing from the spirit and scope of the invention.

Figure 5:
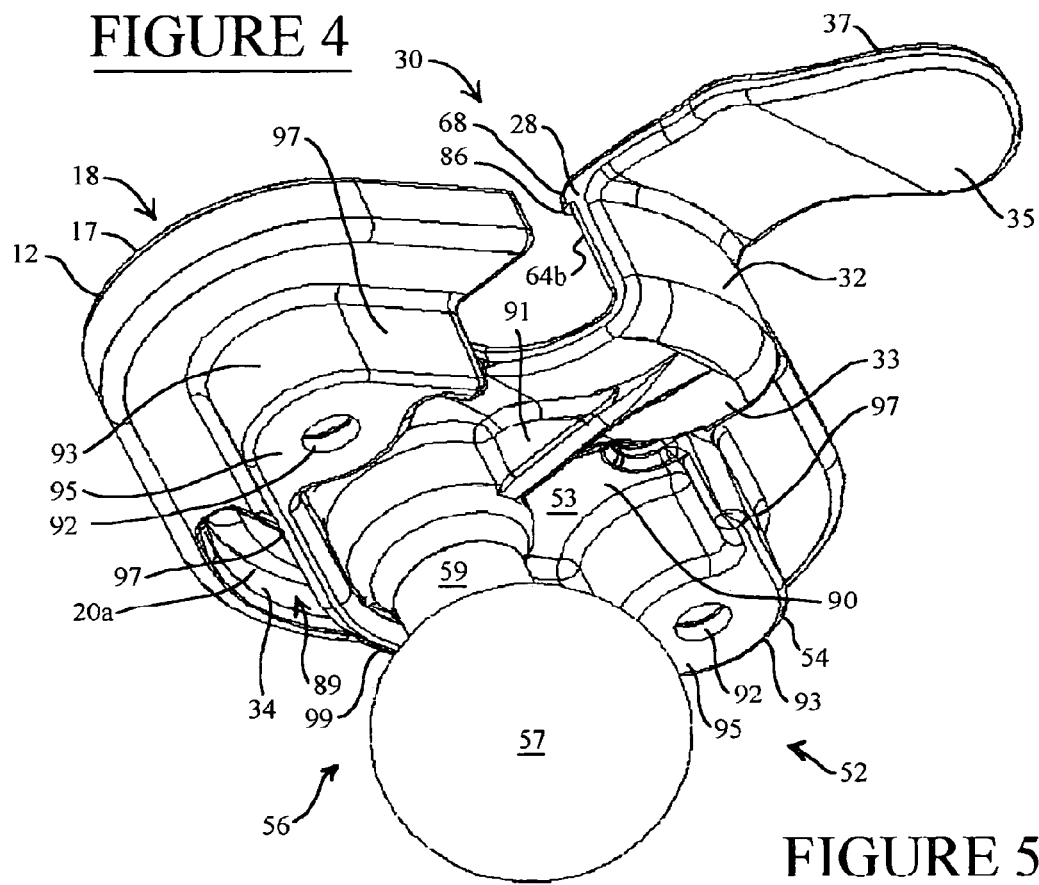
FIG. 5 is a perspective view of female receiver of the invention being structured with connector structure that is configured having a combination of both a pair of spaced-apart fasteners or fastener clearance holes in a round-tipped diamond patterned support structure, and a ball mount portion of a universally positionable ball-and-socket mounting device.

FIG. 5 is a perspective view of female receiver 12 being structured with connector structure 52 that is configured having a combination of both the pair of spaced-apart fasteners or fastener clearance holes in a round-tipped diamond patterned support structure 54 and ball mount 56 of a universally positionable ball-and-socket mounting device according to the universal mounting device described in U.S. Pat. No. 5,845,885, UNIVERSALLY POSITIONABLE MOUNTING DEVICE, issued to the inventor of the present invention on Dec. 8, 1998, which is incorporated in its entirety herein by reference. Accordingly, ball mount structure 56 includes a sphere 57 of resiliently compressible material is presented on a rigid stem portion 59 formed integrally with both floor 90 of receptacle 18 and rigid spine 91 portion of intervening rigid arm 33. Stem 59 presents sphere 57 for access by a pair of clamping arms that together form a socket that is positionally secured relative to sphere 57, as described in U.S. Pat. No. 5,845,885.

Figure 6:
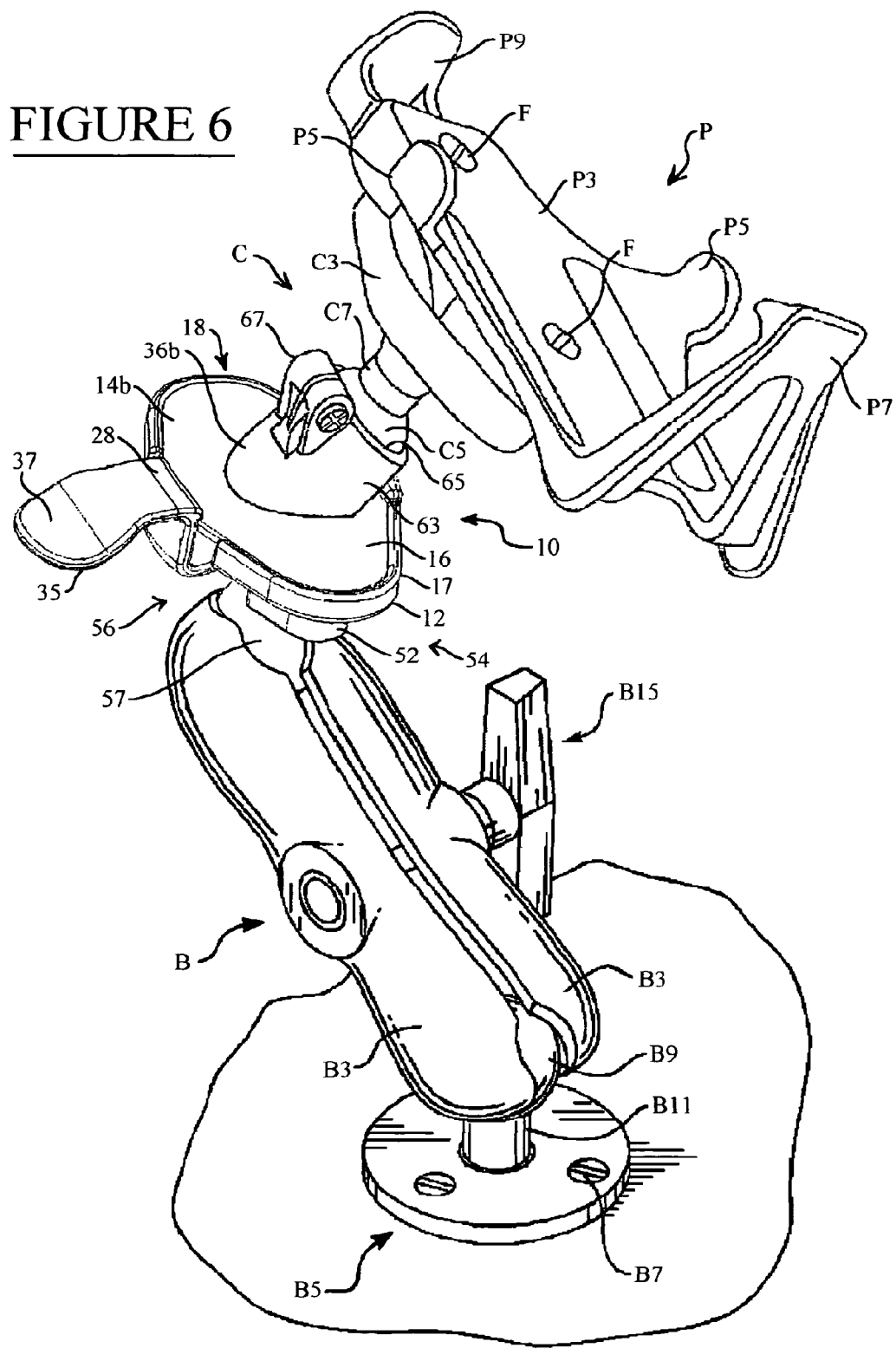
FIG. 6 illustrates one possible application of the snap-in and quick-release system of the invention wherein the female receiver includes the connector structure configured with the combination of both a diamond-patterned support structure and a ball mount portion of a universally positionable ball-and-socket mounting device.

FIG. 6 illustrates one possible application of the snap-in and quick-release system 10 of the invention wherein the connector structure 52 of female receiver 12 is configured with the combination of both diamond patterned support structure 54 and ball mount structure 56. Furthermore, the ball mount structure 56 is illustrated as being coupled as part of a universally positionable ball-and-socket mounting device B according to the universal mounting device described in U.S. Pat. No. 5,845,885, which is incorporated by reference herein. Accordingly, ball mount structure 56 includes resiliently compressible sphere 57. Stem 59 (shown in previous Figures) presents sphere 57 for access by a pair of clamping arms B3 that together form a socket that is positionally secured relative to sphere 57, as described in U.S. Pat. No. 5,845,885. Universal mounting device B is founded on a base B5 that is for example secured to a fixed surface with a quantity of screws or other fasteners B7. A sphere B9 of resiliently compressible material is presented on a post B11 for access by the pair of clamping arms B3 that together form a socket that is positionally secured relative to the sphere B9 when a clamping mechanism B15 is tightened. Sphere 57 of ball mount structure 56 is captured in a second socket formed at the opposite end of the clamping arms B13 and relatively positionally secured by increased tightening of the clamping mechanism B15. The snap-in and quick-release system 10 of the invention is structured to support any of the many different interchangeable male adapter bases 14a through 14n secured by the cooperatively structured female receiver 12, according to the user's choice.

Here, a different interchangeable male adapter base 14b illustrated by example and without limitation with a different connector structure 36b having a socket structure 63 that is configured for rotationally coupling one or another known device platform P. The device platform P is, by example and without limitation, a spring-loaded platform structured to accept any one of a cellular phone, personal digital assistant (PDA), hand-held global positioning system (GPS) receiver or another such hand-held electronic device. One such device platform 110 is the exemplary spring-return device platform shown, which is commercially available from National Products, Incorporated of Seattle, Wash., USA. As disclosed in published co-pending U.S. patent application Ser. No. 10/636,058, SECURE INTERFACE CRADLE FOR POCKET PERSONAL COMPUTER DEVICE, filed in the name of the inventor named in the present application on Aug. 7, 2003, the complete disclosure of which is incorporated herein by reference, device platform P has a device cradle P3 with side and base arms P5 and P7 and a spring-driven keeper P9 for holding any one of the cellular phone, PDA or GPS receiver. The device platform P is, by example and without limitation, coupled to an independent coupler C by one or more fasteners F, the coupler C having a base C3 to which the device cradle P3 is secured, and a sphere C5 of resiliently compressible material that is presented on a post C7 for access by socket structure 63 of male adapter base 14b. By example and without limitation, socket structure 63 is configured having socket 65 that is sized to receive coupler sphere 112b thereinto, and optionally includes a clamping mechanism 67 for securing the coupler 112 and device platform 110 in a desired rotation and orientation. Optionally, socket structure 63 is tilted on exterior surface 40 of the base plate 16 for biasing the orientation away from perpendicular.

Figure 7:
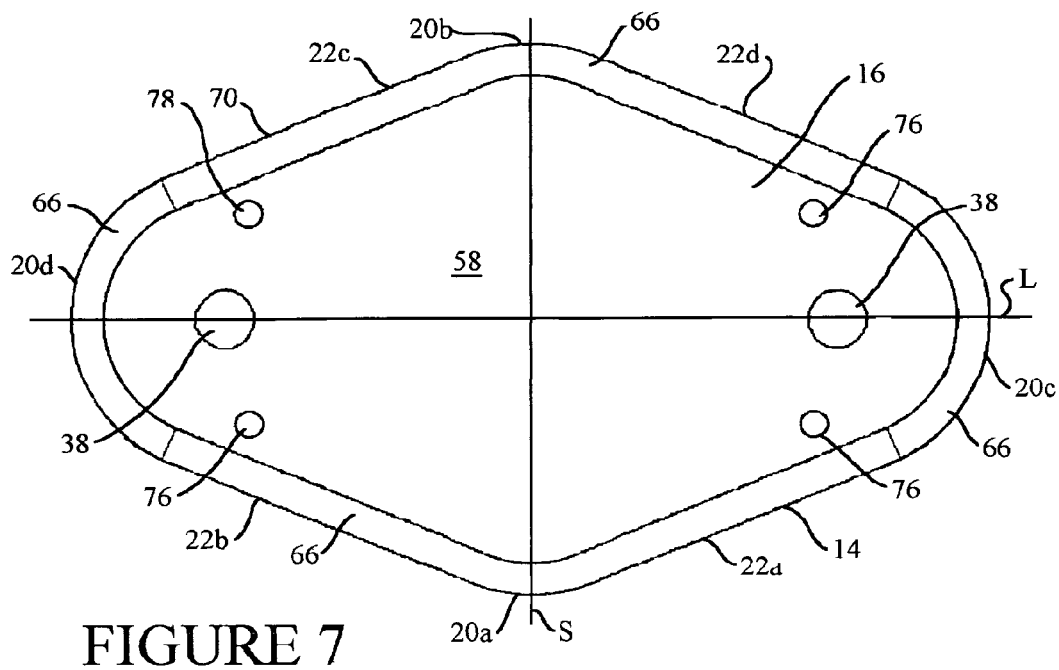
FIG. 7 is a bottom view of base plate that illustrates diamond-shaped exterior bottom surface that is typical of every one of male adapter bases of the invention.

FIG. 7 is a bottom view of base plate 16 that illustrates diamond-shaped exterior bottom surface 58 that is typical of every one of male adapter bases 14a through 14n. When diamond-shaped base plate 16 is installed into cooperating diamond-shaped receptacle 18 of female receiver 12, its diamond-shaped bottom surface 58 mates with receptacle diamond-shaped interior bottom surface 60 (shown in previous figures). Four registration pins 76 are formed in a rectangular pattern within the diamond pattern of the diamond-shaped bottom surface 58 of base plate 16 when four mating precision holes 78 are formed in a cooperating rectangular pattern within the diamond pattern of female receptacle interior bottom surface 60. The rectangular pattern of registration pins 76 is maximized, being near to beveled or curved peripheral installation surfaces 66 of base plate 16, and is extended along the long axis L for maximizing rotational orientation between base plate bottom surface 58 and receptacle bottom surface 60. The rectangular pattern of registration pins 76 shown permits any of the male adapter bases 14a through 14n to be coupled with the female receiver 12 with its base plate 16 turned either direction relative to the receptacle 18.

Figure 8:
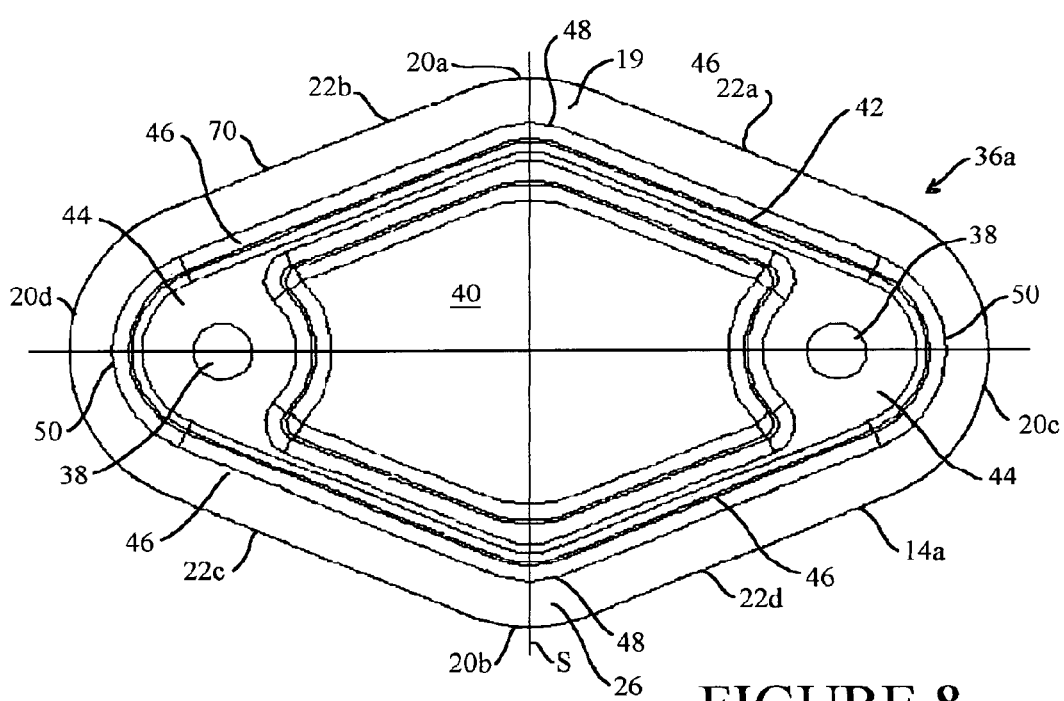
FIG. 8 is a plan view that illustrates one of the different male adapter bases of the invention having a diamond-patterned connector structure that is configured for having secured thereto the mounting structure of an external device to be releasably mounted by the system of the invention.

FIG. 8 is a plan view that illustrates male adapter base 14a being configured having connector structure 36a that is configured for having secured thereto the mounting structure of an external device to be releasably mounted by the system 10 of the invention. The pair of spaced-apart fasteners or fastener clearance holes 38 (shown) of male adapter base connector structure 36a are formed in the pair of bosses 44 integrally formed at the ends of diamond pattern support structure 42 with rounded outer surfaces 50. Integral stiffeners 46 between the bosses 44 are configured in a diamond pattern having rounded side tips 48 at their side intersections. However, stiffeners 46 are optionally configured in another shape desirable for conforming to a ball-and-socket mounting device, or another mounting structure of choice.

Figure 9:
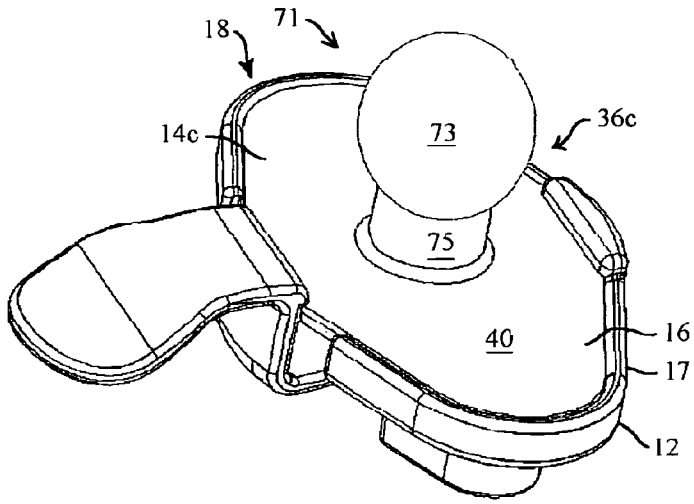
Figure 10:
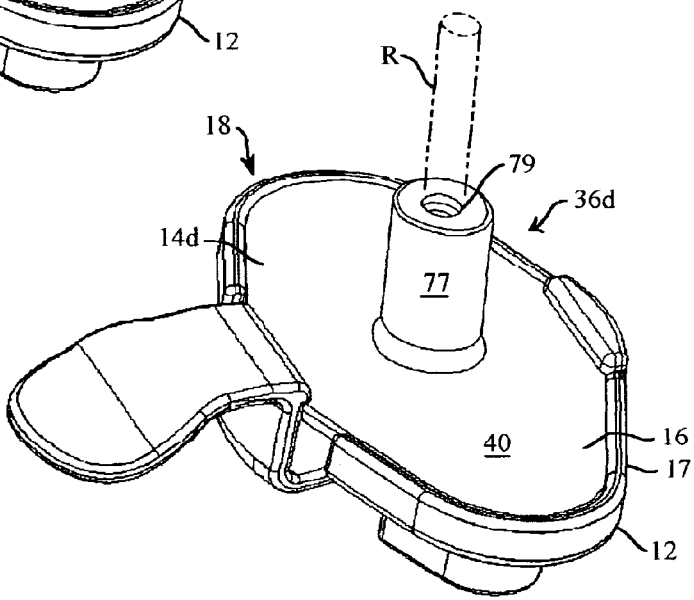
Figure 11:
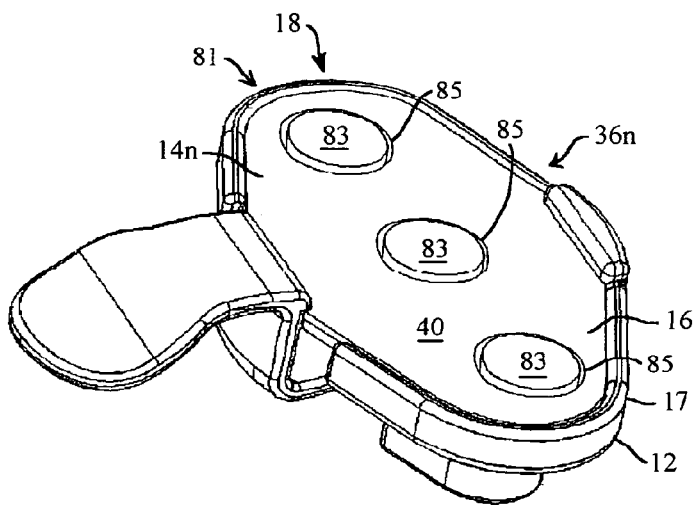

Multiple different male adapter bases 14a-n are provided having different connector structure 36a-n, respectively. FIGS. 9, 10 and 11 show non-exclusive examples of different connector structures 36c-n in addition to both connector structure 36a having the pair of spaced-apart fasteners or fastener clearance holes 38 (shown) in a round-tipped diamond pattern support structure 42, and different connector structure 36b having a socket structure 63. All of the different male adapter bases 14a-n having different connector structures 36a-n are configured with a substantially identical diamond-shaped base plate 16 that is sized and shaped to fit into a slightly oversized cooperating diamond-shaped receptacle 18 of female receiver 12. Accordingly, any of the different male adapter bases 14a-n is quickly and easily interchanged with any other.

FIG. 9 illustrates by example and without limitation another different interchangeable male adapter base 14c having another different connector structure 36c configured with a ball mount structure 71 that includes a sphere 73 of resiliently compressible material is presented on a rigid stem portion 75 formed integrally with exterior surface 40 of the base plate 16. Stem 75 presents sphere 73 for access by a pair of clamping arms that together form a socket that is positionally secured relative to sphere 73, as described herein and in U.S. Pat. No. 5,845,885.

FIG. 10 illustrates by example and without limitation another different interchangeable male adapter base 14d having another different connector structure 36d configured with a support post 77 formed integrally with exterior surface 40 of the base plate 16. Support post 77 is structured for receiving a fastener. For example, the support post 77 includes a lengthwise aperture or bore 79 that is optionally internally threaded for receiving a threaded fastener. Alternatively, lengthwise aperture or bore 79 is optionally structured for receiving a permanently bendable metal rod R (shown in phantom) of the type disclosed in published U.S. patent application Ser. No. 10/698,158, Flexible Support Arm, filed Oct. 31, 2003, also in the name of the inventor named in the present application, both incorporated herein by reference.

FIG. 11 illustrates by example and without limitation another different interchangeable male adapter base 14n having another different connector structure 36n configured with a magnetic coupler 81 including one or more magnets 83 set into a single recess 85 or individual recesses 85 (shown) in the exterior surface 40 of the base plate 16. The magnets 83 are flush or slightly above base plate surface 40. Magnets 83 are optionally molded into the base plate surface 40. Accordingly, the magnetic coupler 81 is effective for securing objects having contact surfaces of steel or other magnetically attractive material.

Alternatively, slugs of steel or other magnetically attractive material are substituted for the magnets 83 for forming magnetic coupler 81. Accordingly, the magnetic coupler 81 is instead effective for securing objects having a contact surface that includes one or more magnets as a part thereof. Magnetically attractive Slugs 83 are optionally molded into the base plate surface 40.

As discussed herein, any of the different male adapter bases 14a-n are provided having different connector structures 36a-n is quickly and easily interchanged with another by operation of the clamping mechanism 30 portion of female receiver 12 for removing one male adapter base 14a and installing a different one of the male adapter bases 14a-n. As such, any of the different male adapter bases 14a-n is quickly and easily interchanged with any other.

While the preferred embodiment of the invention has been illustrated and described, it will be appreciated that various changes can be made therein without departing from the spirit and scope of the invention. For example, any one of the multiple different connector structures 36a through 36n provided by the different interchangeable male adapter bases 14a through 14n is optionally substituted for the different integral connector structure 52 of female receiver 12 illustrated here without departing from the spirit and scope of the invention. Therefore, the inventor makes the following claims.

What is claimed is:

1. A quick connect and disconnect device mounting apparatus, comprising:
 (a) a plurality of different interchangeable male adapter bases, each male adapter base comprising both a symmetrically-shaped base plate and a different one of a plurality of different connector structures;

(b) a female receiver comprising a cooperating symmetrically-shaped receptacle that is structured for receiving thereinto and releasably retaining therein the base plate of any one of the plurality of different interchangeable male adapter bases, the symmetrically-shaped receptacle comprising:
  (1) a relatively fixed retaining lip overhanging a first peripheral portion of the base plate of the male adapter base, and
  (2) a clamping mechanism comprising a resiliently movable retaining lip overhanging a second peripheral portion of the base plate of the male adapter base, and
  (3) an integral connector structure; and
(c) a precision registration mechanism between the base plate of the male adapter base and the receptacle of the female receiver.

2. The apparatus of claim 1 wherein the second peripheral portion of the base plate of the male adapter base overhung by the resiliently movable retaining lip of the clamping mechanism further comprises a peripheral portion of the base plate opposite from the first peripheral portion.

3. The apparatus of claim 1 wherein the precision registration mechanism is substantially symmetrical along at least one axis.

4. The apparatus of claim 1 wherein the precision registration mechanism further comprises at least one precision registration pin and mating precision hole.

5. The apparatus of claim 1 wherein the base plate and receptacle further comprise complementary non-cylindrical shapes.

6. The apparatus of claim 5 wherein the base plate further and the retaining lip portion of the receptacle further comprise complementary partial side wall positioning surfaces along corresponding straight wall surfaces thereof.

7. The apparatus of claim 5 wherein the base plate further and the partial peripheral lip of the receptacle further comprise cooperating nesting surfaces therebetween.

8. A quick connect and disconnect device mounting apparatus, comprising:
(a) a plurality of different interchangeable male adapter bases, each adapter base having both a symmetrically-shaped base plate, and a different one of a plurality of different connector structures each structured for having secured thereto a mounting structure of an external device to be releasably mounted by the device mounting apparatus;
(b) a female receiver having a cooperating symmetrically-shaped receptacle being structured for receiving thereinto and releasably retaining therein the base plate of any one of the plurality of different interchangeable male adapter bases, the symmetrically-shaped receptacle having:
  (1) a partial peripheral lip having an retaining lip portion thereof overhanging a first peripheral portion of the receptacle; and
  (2) a clamping mechanism comprising a resiliently movable retaining lip overhanging a second peripheral portion of the receptacle; and
  (3) an integral connector structure formed as part of an exterior connector surface opposite from receptacle;
(c) a precision registration mechanism between the base plate of the male adapter base and the receptacle of the female receiver; and
(d) wherein one of the interchangeable male adapter bases is assembled with the female receiver with the base plate inserted in the receptacle having the precision registration mechanism engaged therebetween, the retaining lip portion of the receptacle partial peripheral lip and the resiliently movable retaining lip portion of the clamping mechanism overhanging different portions of the base plate body.

9. The apparatus of claim 8 wherein the second peripheral portion of the receptacle overhung by the resiliently movable retaining lip of the clamping mechanism is positioned on an opposite side of the receptacle from the first peripheral portion overhung by the retaining lip portion of the partial peripheral lip.

10. The apparatus of claim 8 wherein the precision registration mechanism is substantially symmetrical along at least one axis of the male adapter base plate and female receiver receptacle.

11. The apparatus of claim 10 wherein the precision registration mechanism is substantially symmetrical along two mutually perpendicular axes of the male adapter base plate and female receiver receptacle.

12. The apparatus of claim 8 wherein the base plate further comprises partial side wall positioning surfaces along peripheral straight edges thereof; and the partial peripheral lip of the receptacle further comprises complementary partial side wall positioning surfaces along corresponding straight interior wall surfaces thereof.

13. The apparatus of claim 12 wherein the base plate further and the partial peripheral lip of the receptacle further comprise cooperating nesting surfaces therebetween, the nesting surfaces being one of a curved and a beveled shape.

14. The apparatus of claim 8 wherein the clamping mechanism further comprises a resiliently flexible arm portion having the resiliently movable retaining lip formed thereon.

15. The apparatus of claim 14 wherein the resiliently flexible arm portion further comprises a curved interior side wall surface corresponding to a curved edge surface of the male adapter base plate.

16. The apparatus of claim 14 wherein the resiliently flexible arm portion occupies part of a gap formed in the partial peripheral lip of the receptacle.

17. A quick connect and disconnect device mounting apparatus, comprising:
(a) a plurality of different interchangeable male adapter bases, each adapter base, comprising:
  (1) a substantially rigid diamond-shaped base plate having:
    (i) a substantially rigid diamond-shaped body between an exterior bottom surface and a spaced-apart exterior connector surface,
    (ii) partial side wall installation surface peripheral of the rigid body and contiguous with the exterior bottom surface,
    (iii) partial side wall positioning surfaces peripheral of the rigid body and contiguous with both the exterior connector surface and the partial side wall installation surface, and
    (iv) first and second integral lip portions each adjacent to opposite side edge intersections between respective pairs of substantially straight edges peripheral of the diamond-shaped rigid body; and
  (2) a different one of a plurality of different connector structures each structured for having secured thereto a mounting structure of an external device to be releasably mounted by the device mounting apparatus, the connector structure being integrally formed with the exterior connector surface between the first and second lip portions; and
(b) a female receiver, comprising:

(1) a substantially rigid diamond-shaped receptacle being sized and shaped to cooperatingly receive the diamond-shaped base plate of any one of the plurality of different interchangeable male adapter bases, the diamond-shaped receptacle having:
  (i) a substantially rigid diamond-shaped floor between an interior bottom surface and a spaced-apart exterior connector surface, and
  (ii) a partial peripheral lip extending from the diamond-shaped floor and partially surrounding the interior bottom surface, the partial peripheral lip including:
    (a) an interior nesting surface structured for cooperating with the side wall installation surface peripheral of the adapter base plate, the interior nesting surface being contiguous with the interior bottom surface of the receptacle floor,
    (b) an interior side wall positioning surface structured for cooperating with the partial side wall positioning surfaces peripheral of the adapter base plate, the interior side wall positioning surface being spaced above the interior bottom surface of the receptacle floor by the receptacle interior nesting surface and contiguous therewith,
    (c) an retaining lip portion thereof overhanging a first peripheral portion of the receptacle floor adjacent to a first edge of the interior bottom surface and spaced away therefrom at about the net thickness of adapter base plate, and
    (d) a break in the partial peripheral lip exposing a second peripheral portion of the receptacle floor adjacent to a second edge of the interior bottom surface opposite from the first portion thereof;
(2) a clamping mechanism integral with the receptacle floor, the clamping mechanism comprising a resiliently movable retaining lip positioned within the break in the partial peripheral of receptacle and spaced away from the interior bottom surface at about the net thickness of adapter base plate; and
  (3) an integral connector structure formed as part of an exterior connector surface opposite from receptacle;
(c) a precision registration mechanism positioned between the exterior bottom surface of the base plate of the male adapter base and the interior bottom surface of the receptacle; and
(d) wherein the base plate of the male adapter base is installed in the receptacle with the precision registration mechanism engaged between the exterior bottom surface of the base plate of the male adapter base and the interior bottom surface of the receptacle with the retaining lip portion of the receptacle peripheral lip of the female receiver overhanging the first integral lip portion of the diamond-shaped base plate body, and the resiliently movable retaining lip portion of the clamping mechanism overhanging the second integral lip portion of the diamond-shaped base plate body.

18. The apparatus of claim 17 wherein the first and second integral lip portions of the male adapter base plate each further comprise curved side edge intersections between respective pairs of substantially straight edges peripheral of the diamond-shaped rigid body.

19. The apparatus of claim 18 wherein the clamping mechanism further comprises a resiliently flexible arm portion having the resiliently movable retaining lip formed thereon, the resiliently flexible arm portion having a curved interior side wall surface corresponding to the curved edge surface of the male adapter base plate.

20. The apparatus of claim 17 wherein the partial side wall positioning surfaces peripheral of the adapter base plate are further inclined to the base plate exterior bottom surface, and the cooperating interior side wall positioning surface of the receptacle are further similarly inclined to the receptacle interior bottom surface.

* * * * *